United States Patent [19]

Olesen

[11] 4,345,486
[45] Aug. 24, 1982

[54] POWER TRANSMISSION HAVING A CONTINUOUSLY VARIABLE GEAR RATIO

[76] Inventor: Henry T. Olesen, 48-50 Søndergaardsvej, DK-3500 Værløse, Denmark

[21] Appl. No.: 22,299

[22] Filed: Mar. 20, 1979

[30] Foreign Application Priority Data

Mar. 22, 1978 [GB] United Kingdom ............... 11424/78

[51] Int. Cl.³ ............................................. F16H 15/26
[52] U.S. Cl. ........................................ 74/198; 74/200
[58] Field of Search ................. 74/190, 198, 207, 212, 74/213, 200

[56] References Cited

U.S. PATENT DOCUMENTS

1,718,846  6/1929  Arter .
1,995,689  3/1935  Shively ................................ 74/200

FOREIGN PATENT DOCUMENTS

901852  1/1954  Fed. Rep. of Germany .
697931  1/1931  France .
1022892  6/1955  France .
689418  3/1953  United Kingdom .
702761  1/1954  United Kingdom .

Primary Examiner—Kenneth Dorner
Attorney, Agent, or Firm—Lewis H. Eslinger

[57] ABSTRACT

The present application discloses a power transmission for transmitting power from a driving shaft to a driven shaft along a main axis of the transmission and having a continuously variable gear ratio, in which torque is transmitted by friction forces at points of tangency between balls and runways and where the balls and runways are divided into axially spaced groups.

9 Claims, 13 Drawing Figures

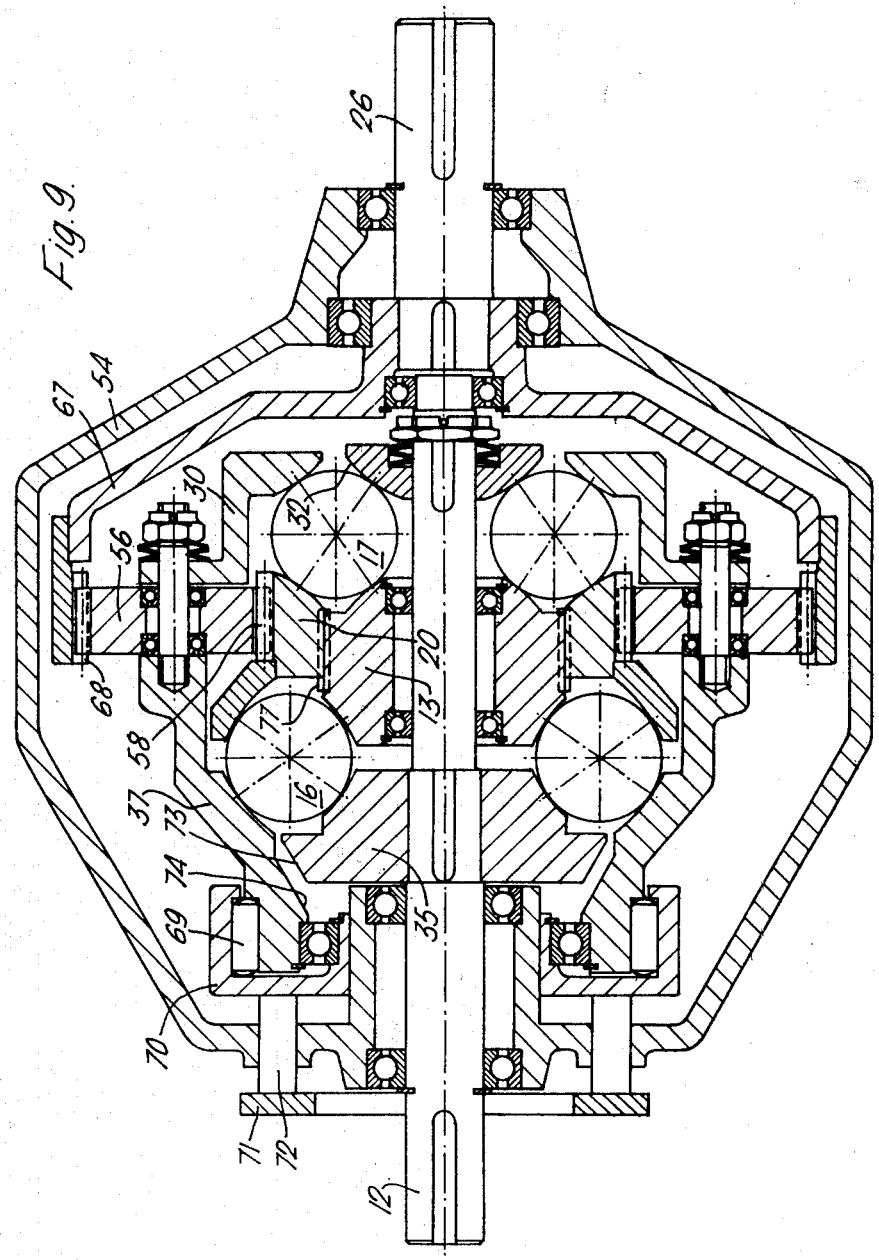

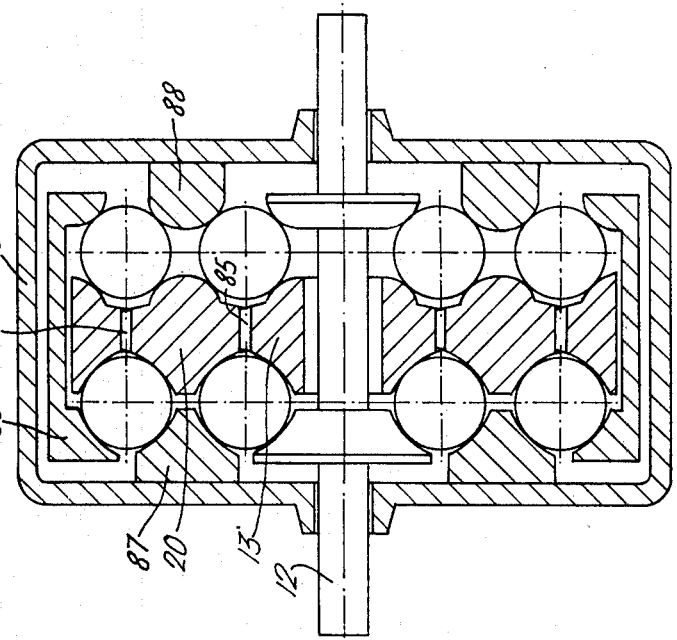
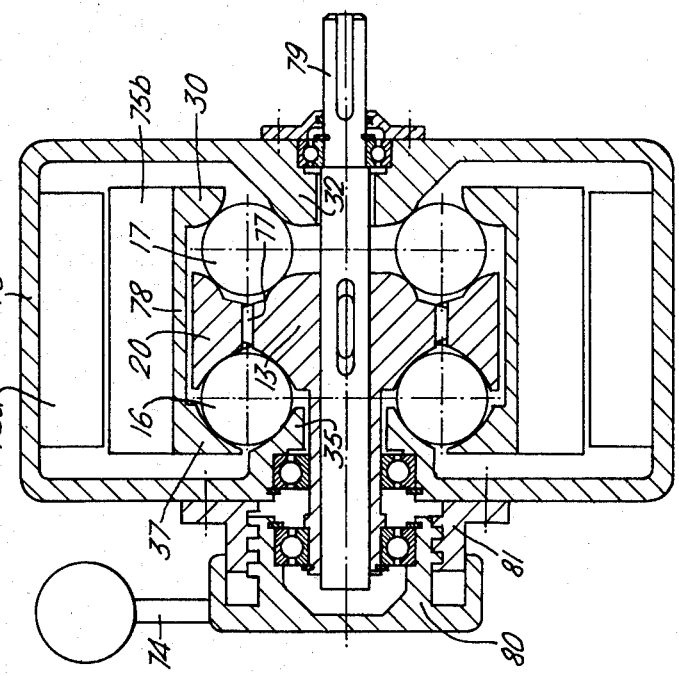

POWER TRANSMISSION HAVING A CONTINUOUSLY VARIABLE GEAR RATIO

The present invention relates to a power transmission having a continuously variable gear ratio, wherein the torque is transmitted by friction forces in the points of tangency between balls and runways, and wherein two groups of balls are provided, the balls in each group rolling freely on its respective bipartite runway with other points in contact with rotating runways connected to the driving and driven shaft respectively.

A power transmission of this type is shown in the specification of French Pat. No. 1,030,702, in which the two groups of balls are coupled in series through a pair of interconnected runways. Between the input runway connected to the driving shaft and the output runway connected to the driven shaft a ball bearing is interposed which must take up the large thrust necessary for transferring the useful force in the points of rolling contact. The friction of said ball bearing reduces the efficiency of the power transmission.

In the power transmission of the present invention the two groups of balls are coupled in parallel, the radially inner as well as the radially outer parts of the axially outer bipartite runways being fixedly interconnected and both the input runway and the output runway being in contact with both groups of balls. By this arrangement a closed structure is obtained in which all axial thrusts are taken up by the torque transmitting balls and hence are useful in efffecting said torque transmission.

Figure 3:
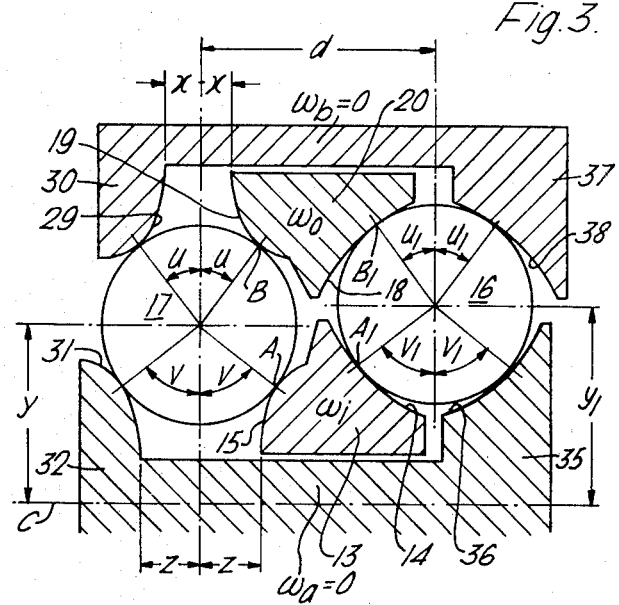
Figure 4:
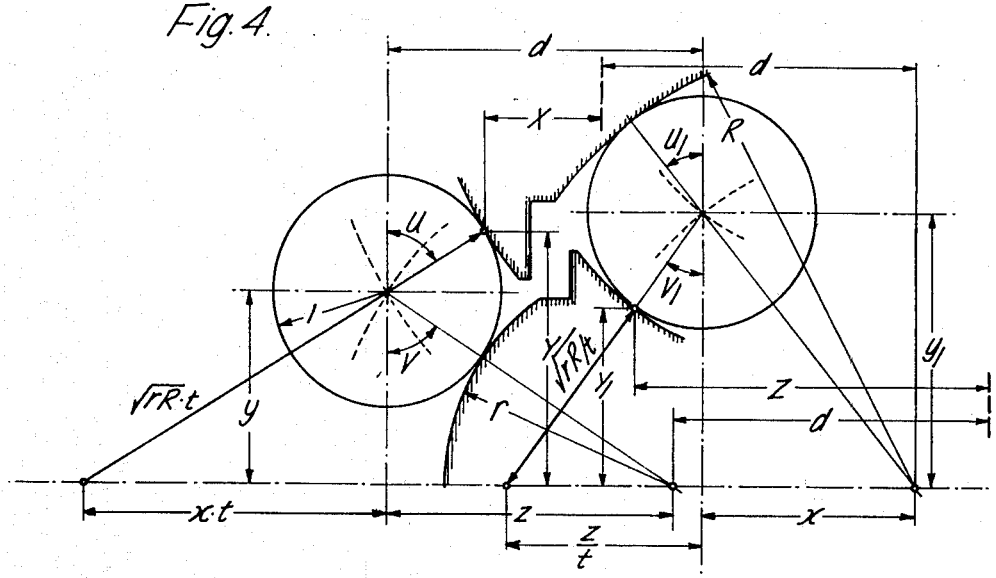
Figure 6:
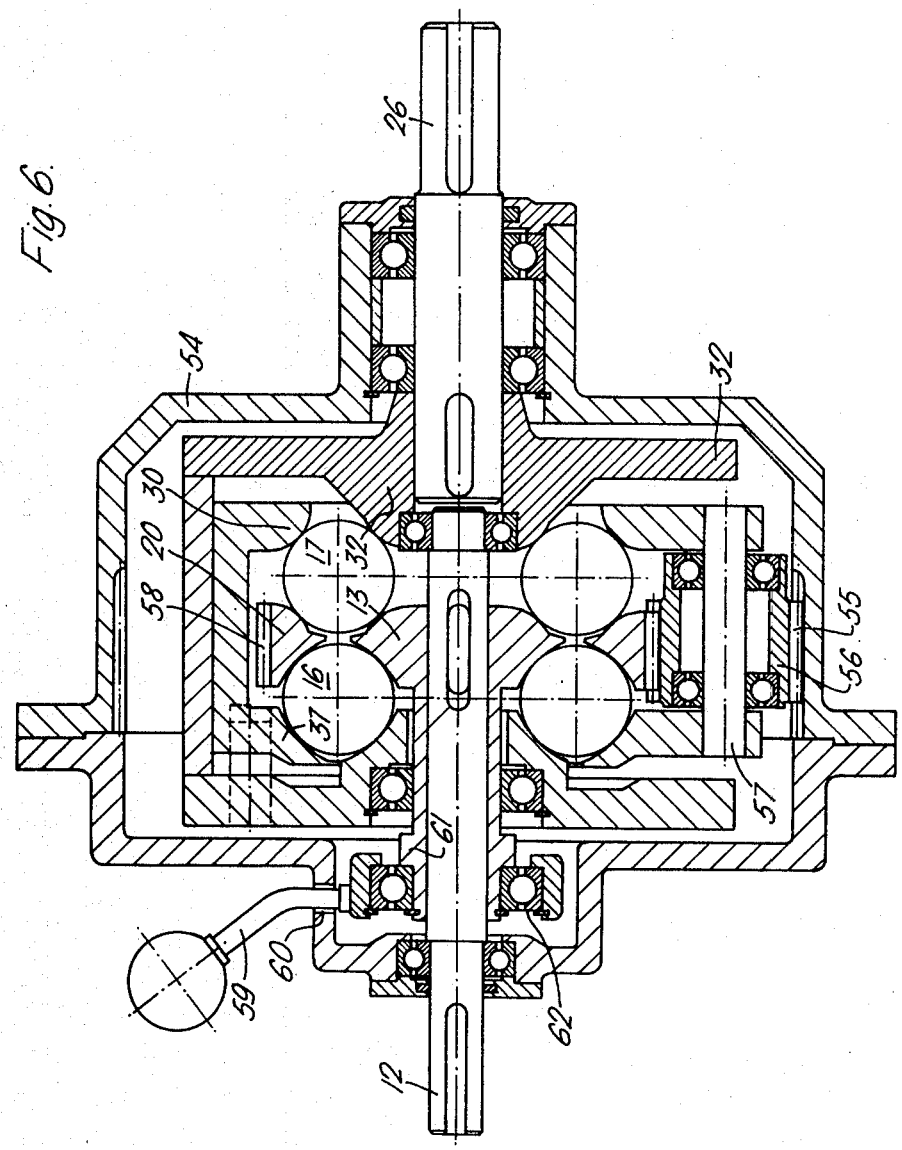
Figure 7:
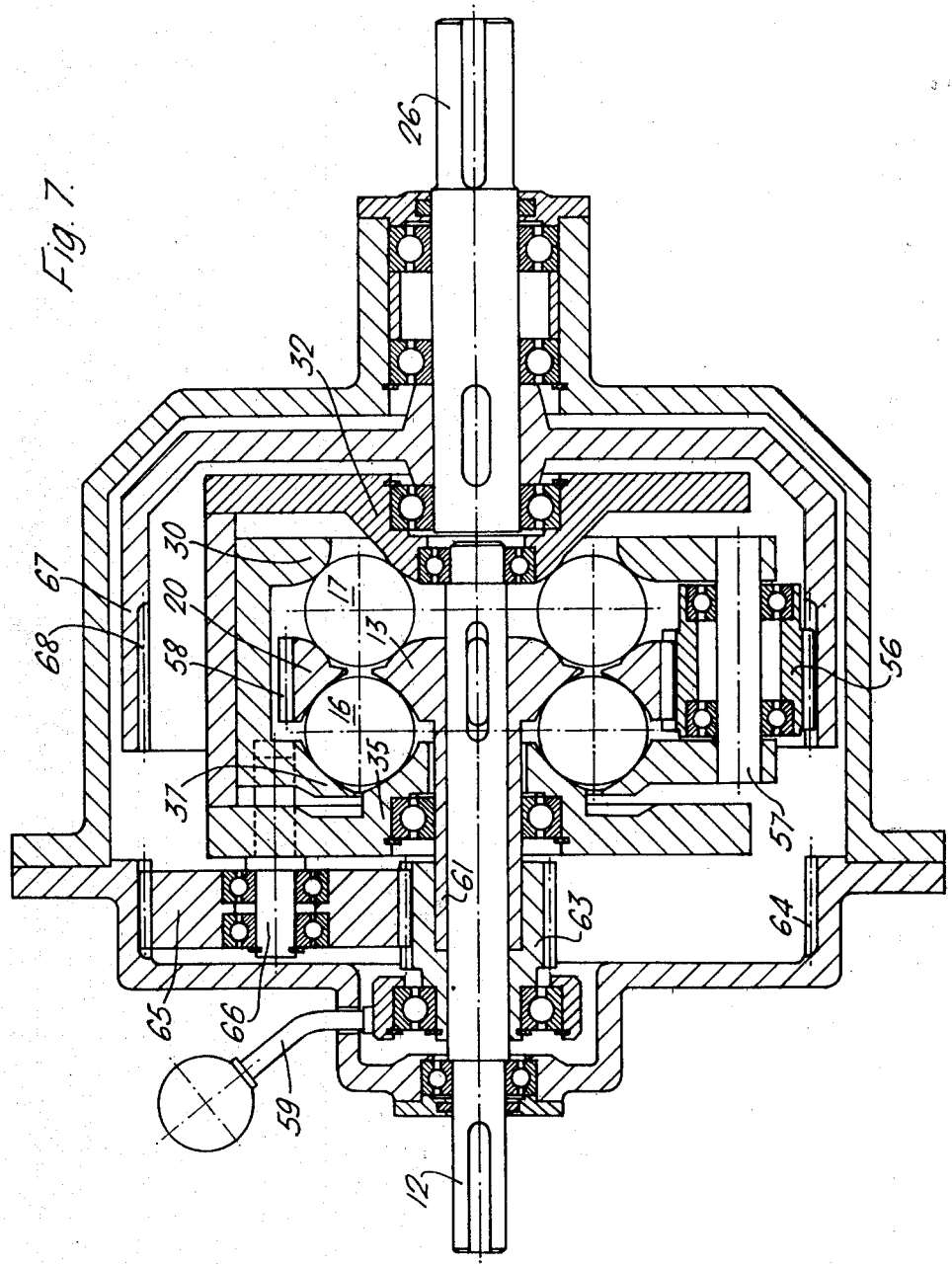
Figure 8:
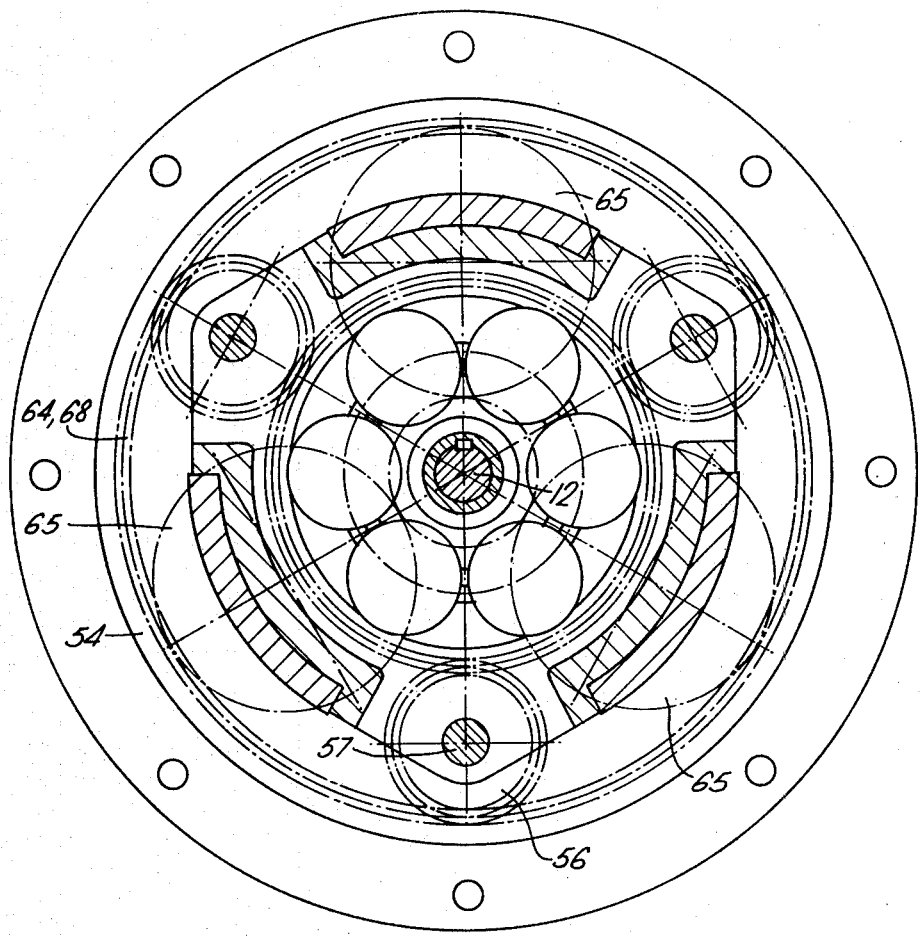

The gear ratio is altered by moving the radially outer interconnected parts of the bipartite runways in relation to the radially inner, interconnected parts of said runways. In order to preserve contact between all of the balls and runways during said movements the shapes of the two sets of runways must fulfil certain conditions which can be expressed in mathematical terms as will appear from the following description with reference to the drawing in which FIGS. 1 and 2 show a vertical cross section and a longitudinal section respectively of an embodiment of the power transmission according to the invention, each figure showing the movable parts in two different operating positions, FIG. 3 is a schematic longitudinal section on a larger scale showing the upper half of the torque transmitting parts of a power transmission according to the invention, FIG. 4 is a schematic section illustrating certain geometrical conditions in a specific embodiment of the invention, FIG. 5 (A and B) shows calculated shapes of runway sections in position for minimum and maximum gear ratio respectively, FIGS. 6 and 7 show respective modified embodiments of the power transmission according to the invention in longitudinal section, FIG. 8 is a cross sectional view of the embodiments shown in FIGS. 6 and 7, and FIG. 9 shows a specific embodiment of the invention particularly suited for automobile transmissions, and FIGS. 10–13 show longitudinal sections of still further respective embodiments of the power transmission according to the invention.

Figure 1:
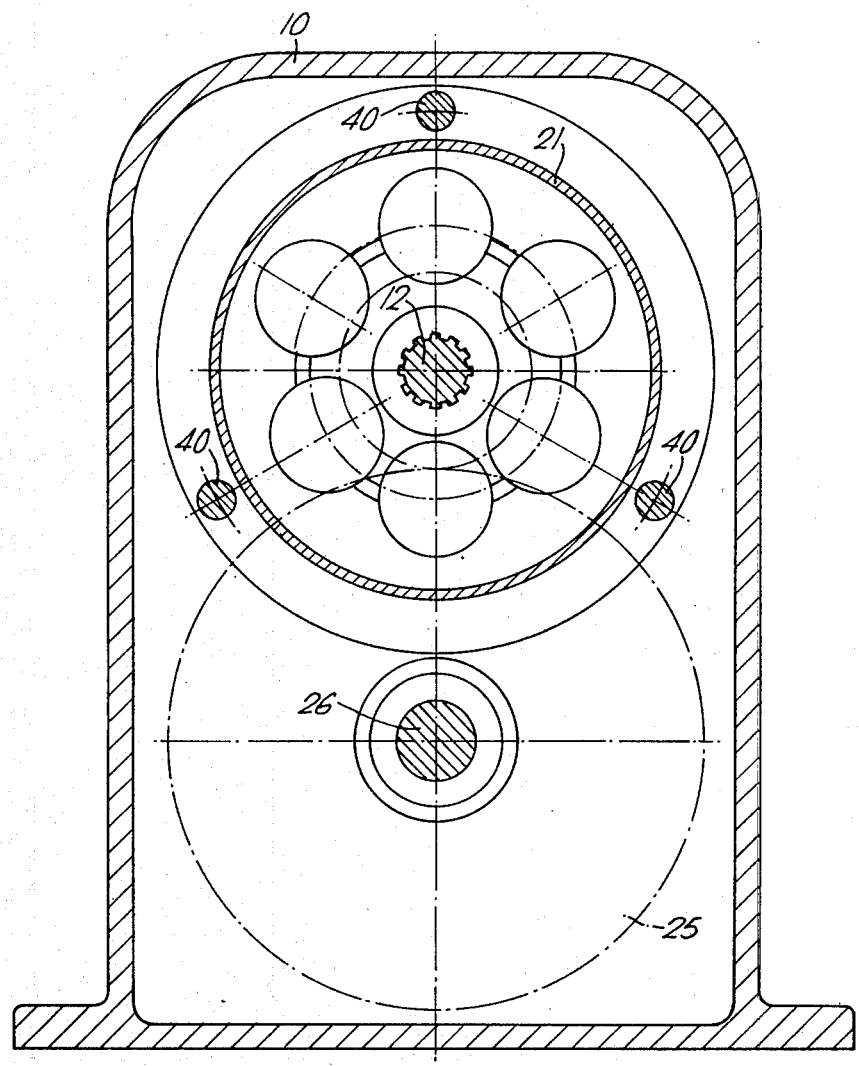
Figure 2:
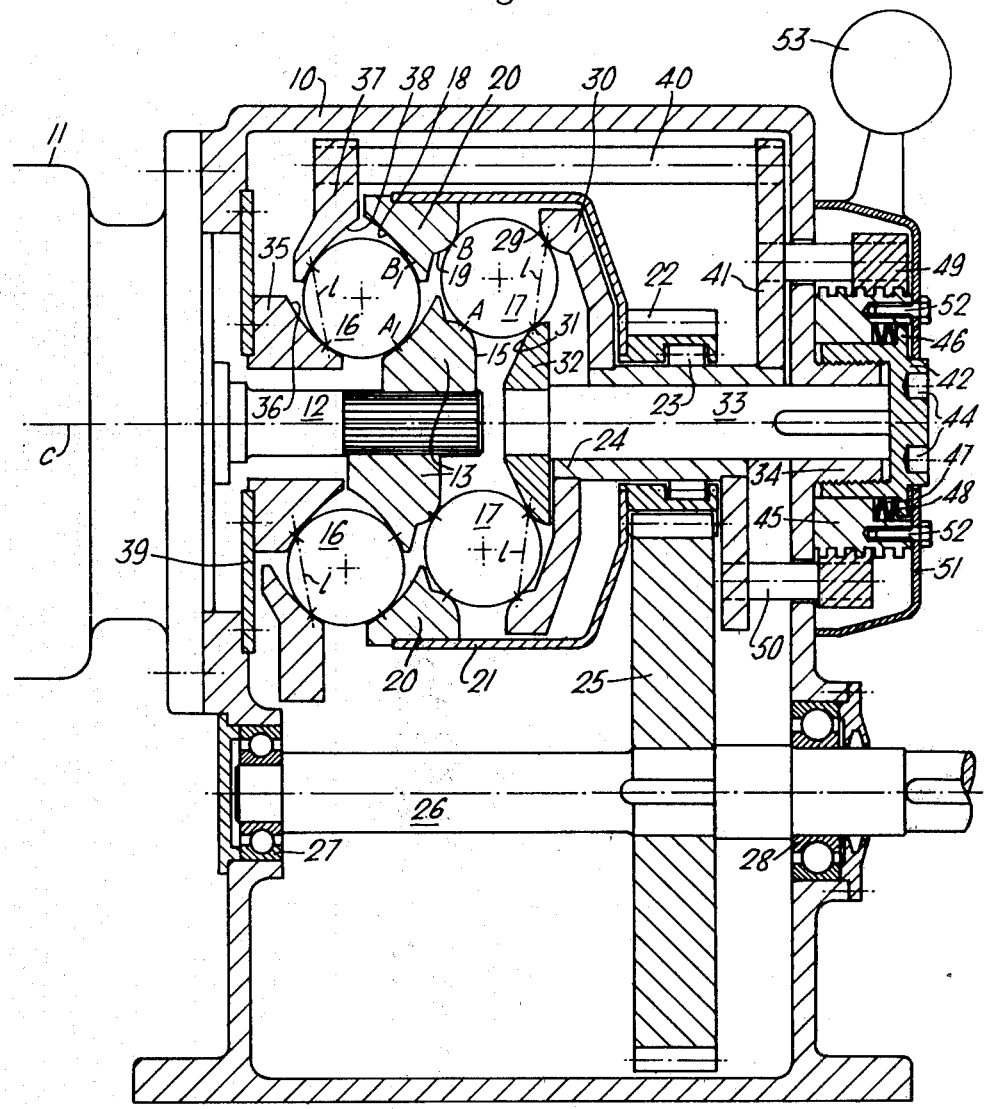

The power transmission shown in FIGS. 1 and 2 comprises a housing 10, to which a flanged motor 11 having a spline shaft 12 is bolted. The shaft 12 extends into the housing 10 and carries on its splined end portion an annular body 13 which engages with the splines of the shaft so as to allow axial displacement but prevent rotation of the body relatively to the shaft. The annular body 13 is provided with oppositely facing runways 14 and 15 for respective sets of balls 16 and 17 each consisting of six balls, said runways being concave and convex respectively. Surrounding the balls is a ring 20 which is also provided with a concave and a convex runway 18 and 19 respectively. Said ring 20 is secured to the outer peripheral portion of a generally cup shaped member 21, the inner, central portion of which is secured to a gear 22, which is rotatably mounted by means of a roller bearing 23 on a sleeve 24 in such a manner that said sleeve is axially displaceable relatively to the gear. Said gear 22 engages with a larger gear 25 fastened to an output shaft 26 which is rotatably mounted by means of ball bearings 27 and 28 in the walls of the housing 10.

The balls 17 roll on two convex runways 29 and 31 formed on annular non-rotatable bodies 30 and 32 respectively which are secured to the inner ends of the sleeve 24 and a shaft 33 respectively, the outer end of which shaft is spline connected to a bushing 34 in the end wall of the housing 10. The balls 16 roll on two concave runways 36 and 38 formed on non-rotatable annular bodies 35 and 37 respectively which are secured to the housing 10 by means of a resilient annular plate 39 and to the inner ends of three equiangularly spaced rods 40 respectively, the outer ends of which rods are secured to a generally triangular plate 41 which in turn is secured to the outer end of the sleeve 24.

An end cap 42 having an internally threaded cylindrical skirt 43 is in engagement with external threads provided on the bushing 34 and abuts the outer end of the shaft 33 projecting from the bushing 34. The outer face of the end cap 42 is formed with a pair of recesses 44 for receiving a suitable tool by means of which the end cap can be turned to adjust the thrust of the shaft 33 and hence of the runway 31.

A cylindrical sleeve 45 having a square thread formed in its outer cylindrical face is rotatably mounted on the skirt 43 of the end cap 42. A radial flange 46 on the end cap 42 projects into a rebate 47 formed circumferentially in the inner cylindrical face of the sleeve 45 at the outer end thereof. Between the flange 46 and the bottom of the rebate 47 spring members 48 are interposed urging the sleeve 45 in friction contact with the outer face of the end wall of the housing 10. An annular collar 49 having an internal thread in engagement with the external thread of the sleeve 45 is secured to the plate 41 by means of a number of rods 50 extending through respective openings in the wall of the housing 10. A cup shaped cover 51 with a center opening for receiving the end cap 42 is secured to the sleeve 45 by means of screws 52. The cover 51 can be rotated manually by operating a control lever 53 secured to the cover whereby the collar 49 as well as the outer runways 29 and 38 connected thereto are axially displaced. By such a displacement the position of said outer runways is altered with respect to the inner stationary runways 31 and 36, whereby the speed of rotation of the ring 20 and hence the output shaft 26 relatively to that of the input shaft 12 is varied.

The instantaneous axes of rolling of the balls being indicated by dot-and-dash lines 1 and the points of tangency with the rings 13 and 20 being designated A and B respectively, the gear ratio is found from the distances of said points from the axes of rolling of the balls in proportion to the distances of the same points from the main axis c. In order to avoid sliding, of course, said realtions must be identical for both sets of balls. In the embodiment shown in FIGS. 1 and 2 this condition has been fulfilled by the provision of concave and convex runways respectively having appropriately chosen radii of curvature, as will be further elucidated in the following with reference to FIG. 3.

The necessary force of pressure on the balls is provided by two adjustable arrangements, the force acting between the outer runways 29 and 38 through the balls 16 and 17 and the intermediate ring 13 being determined by the tension of the rods 40, whereas the force acting on the balls 17 from the stationary inner runway 31 and transferred through the ring 20 and the balls 16 to the inner stationary runway 36 is determined by adjustment of the end cap 42. A uniform pressure is ensured by the resiliency of the annular plate 39 and by the inherent resiliency of the parts interconnecting the runways 29 and 38.

In the schematic sectional view of FIG. 3 the balls, runways and bodies on which the latter are formed are designated by the same reference numbers as in FIG. 2. Also the above mentioned points of tangency A and B have been marked in FIG. 3. Additionally, in this figure the angles between radii to the points of tangency of the balls and runways have been designated by $u$, $u_1$, $v$, and $v_1$ respectively, and the variable distances by which the outer and inner runways are displaced relatively to the balls are designated by $x$ and $z$ respectively. The correspondingly varying radial distances of the ball centers from the main axis c are designated $y$ and $y_1$ respectively. Furthermore the angular velocities of the inner ring 13 and the outer ring 20 are designated $\omega_i$ and $\omega_o$ respectively. The angular velocities $\omega_a$ and $\omega_b$ of the bodies 32, 35 and 30, 37 respectively are zero as also indicated in FIG. 3. Finally the axial distance between the ball centers is designated d, this distance being constant in view of the fact that the runways are symmetric in pairs.

The condition of uninterrupted contact between the balls and the runways is given by $$\frac{dy}{dx} = tg\, u, \quad \frac{dy}{dz} = -tg\, v, \quad \frac{dy_1}{dx} = -tg\, u_1 \text{ and } \frac{dy_1}{dz} = tg\, v_1$$

from which is obtained the relation $$\frac{tg\, u}{tg\, v} = \frac{tg\, u_1}{tg\, v_1} = -\frac{dz}{dx} = g$$

by which a variable quantity g is defined.

Taking the ball radius as a unity of length, the distances from the main axis c of the points of tangency with the outer runways 19, 29 and inner runways 15, 31 on the left side of FIG. 3 are $y + \cos u$ and $y - \cos v$ respectively. The instantaneous movement of the ball being a rotation about the points of tangency on the non-rotating runways 29 and 31, the proportion between the velocities of the points of tangency with the outer and inner rotating runways 19 and 15 respectively is equal to the proportion between the distances of said points from the instantaneous axis of rotation of the ball which is equal to $\sin u / \sin v$.

Thus the gear ratio on the left side is determined by $$\frac{\omega_o}{\omega_i} = f = \frac{\sin u \cdot (y - \cos v)}{\sin v \cdot (y + \cos u)}$$

which for any position of adjustment must be equal to $$f_1 = \frac{\sin u_1 \cdot (y_1 - \cos v_1)}{\sin v_1 \cdot (y_1 + \cos u_1)}$$

in order that the balls can roll without sliding in both sides of the transmission.

If the left-hand runway sectional curves are established, f and g are known for any x and z values belonging together, and the corresponding curves for the right-hand runways are determined by the condition that $$\frac{f}{g} = \frac{\frac{y}{\cos v} - 1}{\frac{y}{\cos u} + 1} = \frac{\frac{y_1}{\cos v_1} - 1}{\frac{y_1}{\cos u_1} + 1} \text{ and } \frac{tg\, u_1}{tg\, v_1} = g$$

shall be fulfilled in any point.

This leads to $$\frac{f + g}{y_1} = \frac{g}{\cos v_1} - \frac{f}{\cos u_1}$$

which may be transformed to the differential equation $$\sqrt{g^2 + \left(\frac{dy_1}{dx}\right)^2} - f\sqrt{1 + \left(\frac{dy_1}{dx}\right)^2} = \frac{f + g}{y_1}$$

for determination of $y_1$, when f and g are known functions of x.

For positive values of $dy_1/dx$ the given y-function forms a particular solution of the equation for the given runway curves, whereas solutions for determining the sought, corresponding runway curves must satisfy the equation with negative roots.

Among the innumerable runway curves that fulfil said condition an example shall be given which is distinguished by the possibility of relatively easy determination of section curves by numerical integration.

The shape of the convex runways is so selected that the displacements of the outer and inner runways are determined by $x = a\, tg\, u$ and $z = b\, tg\, v$, so that:

$$\frac{dy}{dx} = \frac{x}{a}, \quad \frac{dy}{dz} = -\frac{z}{b}, \quad y = \frac{x^2}{2a} + K_1 = K_2 - \frac{z^2}{2b},$$

the constants a, b, $K_1$ and $K_2$ being chosen to suit the requirements for gear ratio etc.

Above it has been assumed that both pairs of runway curves at one side of the transmission are determined arbitrarily, after which the outer pair of runways at the opposite side of the transmission is calculated from the differential equation $$y_1 = F\left(x_1 \frac{dy_1}{dx}\right),$$

and the inner pair of runways subsequently determined by the obtained $(x, y_1)$-function in connection with the known relation between $x$ and $z$.

For the sake of completeness it is noted that it is also possible, of course, to determine the $(z, y_1)$-function directly from the rewritten differential equation:

$$g\sqrt{1 + \left(\frac{dy_1}{dz}\right)^2} - f\sqrt{1 + \left(g\frac{dy_1}{dz}\right)^2} = \frac{f+g}{y_1}$$

and thereafter find the $(x, y_1)$-curve by use of the $(x, z)$-function.

In principle the section shape of two arbitrary runways may be chosen freely and the remaining runways be determined by the stated equations. In practice, however, it will usually be preferable to choose the runway curves at one side of the transmission and calculate the two corresponding pairs of runways as shown above.

As an example of another choice of known runways FIG. 4 shows schematically an embodiment having two spherical pairs of runways consisting of internal spherical faces with the radius $R$ at one side of the transmission and external spherical faces with the radius $r$ at the other side.

In this case the condition of identical gear ratios at both sides can be expressed by $$\left(\frac{y}{\cos u} + 1\right)\left(\frac{y_1}{\cos v_1} - 1\right) = rR$$

which for any value of $R = r + 2$ is satisfied for the center movement curves determined by the parametric equations:

$$(x, y) = \left(\sqrt{rR - 2\sqrt{rR} \cdot F},\ \sqrt{1 + 2\sqrt{rR} \cdot t(tF - 1)}\right)$$

$$(z, y_1) = \left(\sqrt{rR - 2\sqrt{rR} \cdot t(tF - 1)},\ \sqrt{1 + 2\sqrt{rR} \cdot F}\right)$$

in which the independent variable $$t = -\frac{d(z^2)}{d(x^2)} = \frac{z}{x} \cdot g = \frac{y}{x} \cdot tgu = \frac{z}{y_1} \cdot ctgv_1$$

and $$F = F(t) = \frac{t + \ln t + C}{(t + 1)^2}$$

The arbitrarily chosen constant $C$ decides the possible curves in various distances from the main axis, and may be selected to suit particular requirements in respect to gear ratio etc. Based on a fixed center distance in the symmetrical position, $C$ is established by putting $$y = y_1 = a = \sqrt{1 + 2\sqrt{rR} \cdot \frac{t_o}{t_o^2 - 1}},$$

$$t_o = \frac{\sqrt{rR} + \sqrt{rR + (a^2 - 1)^2}}{a^2 - 1},\quad C_a = \frac{2t_o}{t_o - 1} - \ln t_o.$$

For any choice of $C$, and in any position, the gear ratio is given by $$f = \frac{g}{t} \cdot \sqrt{\frac{r}{R}} = \frac{x}{z} \cdot \sqrt{\frac{r}{R}}$$

and the co-ordinates of the center movement curves mutually interrelated by the general equations:

$$x^2 + y_1^2 = (r + 1)^2,\ x^2 t^2 + y^2 = (\sqrt{rR} \cdot t - 1)^2$$

$$z^2 + y^2 = (r + 1)^2,\ z^2 + y_1^2 t^2 = (\sqrt{rR} + t)^2$$

Center curve angles (equal to runway face angles at corresponding points) may be computed from:

$$x = (r + 1)\sin u_1 = \left(\sqrt{rR} - \frac{1}{t}\right)\sin u,\ y =$$

$$(r + 1)\cos v = (\sqrt{rR} \cdot t - 1)\cos u$$

$$z = (r + 1)\sin v = (\sqrt{rR} + t)\sin v_1,\ y_1 =$$

$$(r + 1)\cos u_1 = \left(\frac{\sqrt{rR}}{t} + 1\right)\cos v_1$$

Thus, the co-ordinates of the sought outer runways are given by the parametric presentation:

$$X = x - \sin u = \frac{(\sqrt{rR} - 1)t - 1}{\sqrt{rR} \cdot t - 1} \cdot \sqrt{rR - 2\sqrt{rR} \cdot F}$$

$$Y = y + \cos u = \frac{\sqrt{1 + 2\sqrt{rR} \cdot t(t \cdot F - 1)}}{1 - \frac{1}{\sqrt{rR} \cdot t}}$$

and, for the inner runways:

$$Z = z + \sin v_1 = \frac{\sqrt{rR} + 1 + t}{\sqrt{rR} + t} \cdot$$

$$\sqrt{rR - 2\sqrt{rR} \cdot t(t \cdot F - 1)}$$

$$Y_1 = y_1 - \cos v_1 = \frac{\sqrt{1 + 2\sqrt{rR} \cdot F}}{1 + \frac{t}{\sqrt{rR}}}$$

For geometrical construction of runway curvatures it may be noticed that the length of the perpendicular to the runway face in point (X,Y) from said point to the pint of crossing with the main axis equals $\sqrt{rR} \cdot t$ while the projection of the axis of same perpendicular's section from ball center to the axis is $x \cdot t$, and analogous for point (Z,Y$_1$) with reciprocal values of t, as indicated on the figure.

Figure 5:
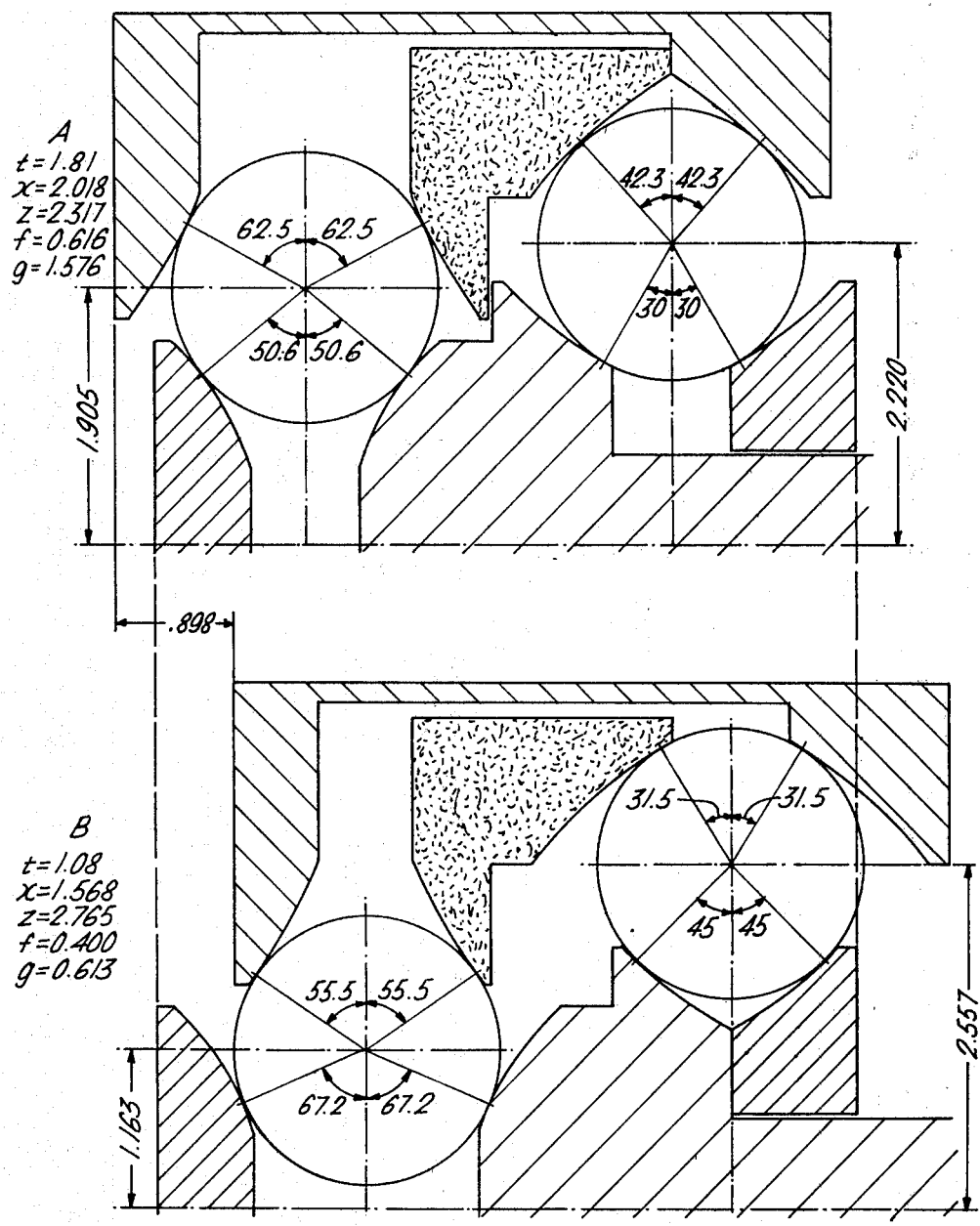

FIGS. 5, A & B, show the actual shapes of runway pairs computed from the above equations selecting r,R=2,4 and C=3.08, and putting $t_{max}$=1.81 and $t_{min}$=1.08 respectively.

In the embodiment of FIGS. 1 and 2 the axially outer pair of runways at each side are stationary whereas the rotating movement is transferred from an radially inner pair of runways with the angular velocity $\omega_i$ to an radially outer pair of runways with the angular velocity $\omega_o = f \cdot \omega_i$. However, there is nothing to prevent choice of other combinations of stationary and rotary pairs of runways, the relative rotations being generally determined by the relation $$\omega_o - \omega_b = f(\omega_i - \omega_a)$$

using the designations shown in FIG. 3. If, for example, the intermediate lpairs of runways are linked by a toothed gearing allowing axial displacement, so that $\omega_i = \omega_o$, and $\omega_a = 0$ is chosen, then $$\omega_b = (1-f)\omega_i$$

which shows that the gear ratio from a shaft connected to the intermediate pairs of runways to the axially and radially outer pairs of runways can be regulated down to zero, if $f_{max}$ is brought up to 1 (whereby lines through the points of tangency intersect on the main axis c).

The variable power transmission according to the invention can be combined with planet gears in various ways whereby particular properties may be obtained.

A simple structure of this type is shown in FIGS. 6 and 8, in which the input and output shafts as well as the torque transmitting balls and annular bodies cooperating therewith are designated by the same reference numbers as the corresponding parts in FIGS. 1 and 2.

The overall gear mechanism is enclosed in a gear box 54 provided with internal teeth 55 with which three planet gears 56 are in engagement. The journals 57 of said planet gear are carried by the unit constituted by the outer runway bodies 30 and 37 which is so mounted as to be axially displaceable but not rotatable with respect to the unit constituted by the inner runway bodies 32 and 35. In engagement with the planet gears 56 is also a sun gear constituted by external teeth 58 on the ring 20 on which the driven runways are formed. The ring 20 is freely displaceable and rotatable. The annular body 13 on which the driving runways are formed is slidingly, but non-rotatably mounted on the input shaft 12. The body 13 can be displaced by operation of a control lever 59, which extends through a helical slot 60 in the gear box and activates a sleeve 61 carrying the body 13 through a ball bearing 62. The axial position of the annular body 13 determines the gear ration of the transmission.

The inner runway bodies 32 and 35 being secured to the output shaft 26 and the planet carrier 30, 37 being non-rotatably connected to the output shaft, the overall gear ration of the transmission will be $$f_t = \frac{s \cdot f}{s \cdot f + p}$$

where s and p are the numbers of teeth on the ring 20 and in the gear box 54 respectively, whereas f is the gear ratio between the inner ring 13 and the outer ring 20 in case the outer runway bodies 30 and 37 are held against rotation (in which case the gear box 54 would rotate in the opposite direction with the speed of rotation sf/p relatively to the input shaft).

If so desired, of course, the direction of power flow through the transmission may be reversed, so that the shaft 26 is used as input shaft and the shaft 12 as output shaft.

Whereas in the embodiment of FIG. 6 the variation of the gear ratio $f_t$ is reduced as compared with the variation of f, FIG. 7 shows a power transmission in which the friction gear is combined with a double planet gear in such a manner that the gear ratio variation can be increased as desired by appropriate choice of the gear ratio of one planet gear, the sun gear 63 of which is slidingly but non-rotatably mounted on the input shaft 12 being fixedly connected with the sleeve 61 carrying the inner ring 13. In FIG. 7 the same reference numbers as in FIG. 6 have been used for similar parts. The ring gear 64 of the latter planet gear is formed on the inner cylindrical wall of the gear box 54, and the planet gear wheels 65 are supported by journals 66 which are fixed to the structure comprising the inner runway bodies 32 and 35. Thus the axially outer runways are rotated with a constant angular speed relatively to the input shaft 12. The output shaft 26 is fixedly connected to an internally toothed ring 67, the teeth 68 of which are in engagement with the planet gear wheels 56 carried by the runway bodies 30 and 37.

The overall gear ratio of this power transmission is determined by $$f_q = \frac{e - sf}{p + e}$$

where e is the number of teeth of the sun gear wheel 63 on the input shaft 12, the stationary ring gear 64 having the same number of teeth p as the rotating ring gear 67,68.

If f can be varied from $f_{min}$ to $f_{max}$ and a variation of the speed of the output shaft from standstill to maximum number of revolutions in the direction of the input shaft is required, $e = s \cdot f_{max}$ is selected, whereas $e = s \cdot f_{min}$ is used, if variation from standstill to full speed in the opposite direction is required. In both cases $f_q$ will be variable from 0 to $$f_{q\,max} = \frac{s}{p + e} \cdot (f_{max} - f_{min}).$$

By choosing an intermediate size of the number e the rotation of the output shaft can be varied from a given number of revolutions in one direction via standstill to a given number of revolutions in the opposite direction. If, for example, $$e = \frac{s}{2} \cdot (f_{max} + f_{min})$$

is chosen, the gear ratio can be varied between $$\pm \frac{s}{2(p+e)} \cdot (f_{max} - f_{min})$$

The section shown in FIG. 8 is common to the structures shown in FIGS. 6 and 7, the planet gear wheels 65 which are only present in the latter embodiment being shown in dotted lines in FIG. 8.

In the embodiment of FIG. 9 the axially outer runway bodies 32 and 35 are fitted on the input shaft 12, whereas the axially inner double runway bodies 13 and 20 are freely displaceable axially but coupled for joined rotation by splines 77. The annular body 20 is provided with teeth 58 in engagement with planet gears 56, the journals of which are fixedly positioned at the body 30,37 carrying the outer runways and being rotatable in same direction as the input shaft rotates, but held against reverse rotation by a one-way stop device 69, and axially displaceable by actuation of a non-rotatable ring member 70 connected to an external ring 71 through pins 72. The planet gears 56 also engage with the teeth 68 of an internally toothed gear wheel 67 on the output shaft 26.

The numbers of teeth on the gear 67 and the member 20 being p and s respectively, the gear ration is determined by $$\frac{\omega_i}{\omega_o} = \frac{p}{s}\left(\frac{1}{f} - 1\right) = \frac{1}{F}$$

Choosing $f_{max}=p/(p+s)$ results in $F_{max}=1$, involving that the torque will be transmitted directly through the gear mechanism so that no reaction momentum will be transferred to the ring 70. Operating in this position, therefore, the member 30,37 may rotate freely at any speed with no influence on the 1:1 transmission from input to output shaft, and may as well revolve with the speed identical to that of the said shafts, in order to eliminate wear and energy loss in the gear system.

The synchronous rotation of the entire gear (the housing 54 being the only exception) is ensured by a friction coupling consisting of a cone 73 on the member 35 which in the $f_{max}$-position engages with a conical surface 74 on the member 37.

At any gear ratio different from the direct transmission occurring for $f=f_{max}$ the torque conversion will induce a reverse momentum on the ring member 70 through the back stop device 69, while the balls and gears will co-operate in rotating the output shaft at reduced speed compared to the input shaft.

In FIG. 9 the runway curvature is based on the double spherical design shown in FIGS. 4 and 5, giving $f_{min} \approx \frac{1}{3}$ and $f_{max} \approx \frac{2}{3}$. Thus, with p/s=2 the resulting gear ratio varies from $F_{min}=\frac{1}{4}$ to $F_{max}=1/1$. Such range of gear ratios is suitable for automobile transmissions where the advantage of eliminated wear and energy losses can be turned to account during the greater part of driving hours when no gearing down is required.

If, in FIG. 9, the housing 54 is removed, and the gear wheel 67 held against rotation, the member 30,37 will rotate in the reverse direction relative to the shaft 12, the gear ratio being $$-F = \frac{p}{sf} - \frac{p+s}{s}$$

Thus, the gear ratio F, equals zero when $f=p/(p+s)$ causing non-rotation of the shaft 12 if employed as output (and extended to the right) with the unit 30,37 connected to the input shaft.

FIG. 10 shows a gear motor having stator windings 75a mounted on the inner cylindrical wall of a housing 76 and rotor windings 75b mounted on a generally cylindrical member 78 comprising annular runway bodies 30 and 37 like those shown in FIGS. 2 and 3. The gear motor further comprises stationary annular runway bodies 32 and 35 as well as intermediate runway rings 13 and 20 and balls cooperating with said bodies and rings in a manner similar to that described in connection with FIGS. 1-3. However, in the present structure the inner ring 13, which is splined to the motor shaft 79 and is axially displaceable thereon by means of a control lever 74 and a srew mechanism 80, 81, is also coupled to the outer ring 20 through splines 77, so that said rings 13 and 20 and shaft 79 rotate with the same velocity relatively to the rotor as determined by the gear ratio $1/(1-f)$.

If the cylindrical member 78 instead of being part of the rotor of an electromotor is coupled to a shaft (not shown), and the direction of powertransmission is reversed, then $f=1$ will correspond to non-rotation of the output shaft. Thus the speed of rotation of the output shaft can be varied continuously from zero to a maximum value or between two values on either side of the zero point.

Figure 11:
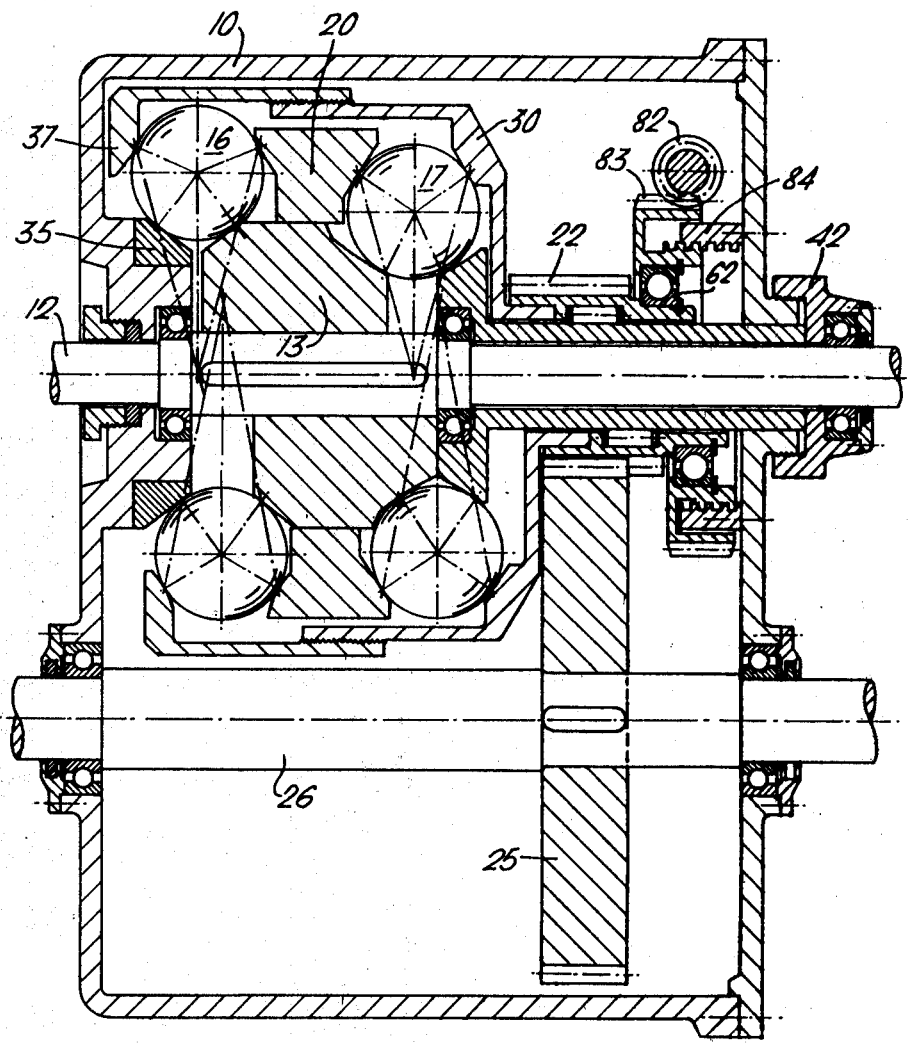

FIG. 11 shows a longitudinal section through a power transmission based on the abovementioned principle, with all parts similar to previously described embodiments designated with reference numerals identical to those formerly used. The upper portion of the figure illustrates the zero-ratio position of runways, whereas underneath the main axis the transmission is shown in its maximum speed position.

The gear ratio is varied by turning a worm spindle 82 in engagement with teeth at the circumference of an annular collar 83 having external thread in engagement with the internal thread of a sleeve 84 fastening to the housing 10. The axial displacement of the collar 83 is transmitted to the outer runway carrying body 30, 37 through a ball bearing 62 and a pinion gear 22 fixedly connected to the said body. The pinion gear 22 is in engagement with the gear wheel 25 fitted on the output shaft 26, the revolutions of which thus can be varied infinitely from zero to maximum speed.

An increase of the range of variation can be obtained by providing a double set of runways. FIG. 12 shows such a structure comprising three intermediate runway rings which are interconnected through splines 85 and 86 and are freely rotating with a common angular velocity $\omega_2$, and annular bodies 87 and 88 which are fixed to the housing 89 and formed with axially outer, radially intermediate, stationary runways. Letting f and F be the gear ratios determined by the inner and outer ball sets respectively, the overall gear ratio, i.e. the ratio between the angular velocity $\omega_3$ of the generally cylindrical member 90 and the anbular velocity $\omega_1$ of the shaft 12 is found to be $$F_2 = \frac{\omega_3}{\omega_1} = \frac{1-F}{1-\frac{1}{f}}.$$

It is noted that this gear ratio is negative corresponding to reversal of the direction of rotation when $f<1$ and F<1. If the runways are so arranged that F increases with decreasing f, the resulting variation becomes large, even if f and F vary only relatively little individually, for example from 0.5 to 0.75 in which case $\omega_3$ varies from $-0.25\,\omega$ to $-1.5\,\omega_1$, i.e. in the proportion 1:6 as compared to the proportion 1:1.5 for f and F.

Figure 13:
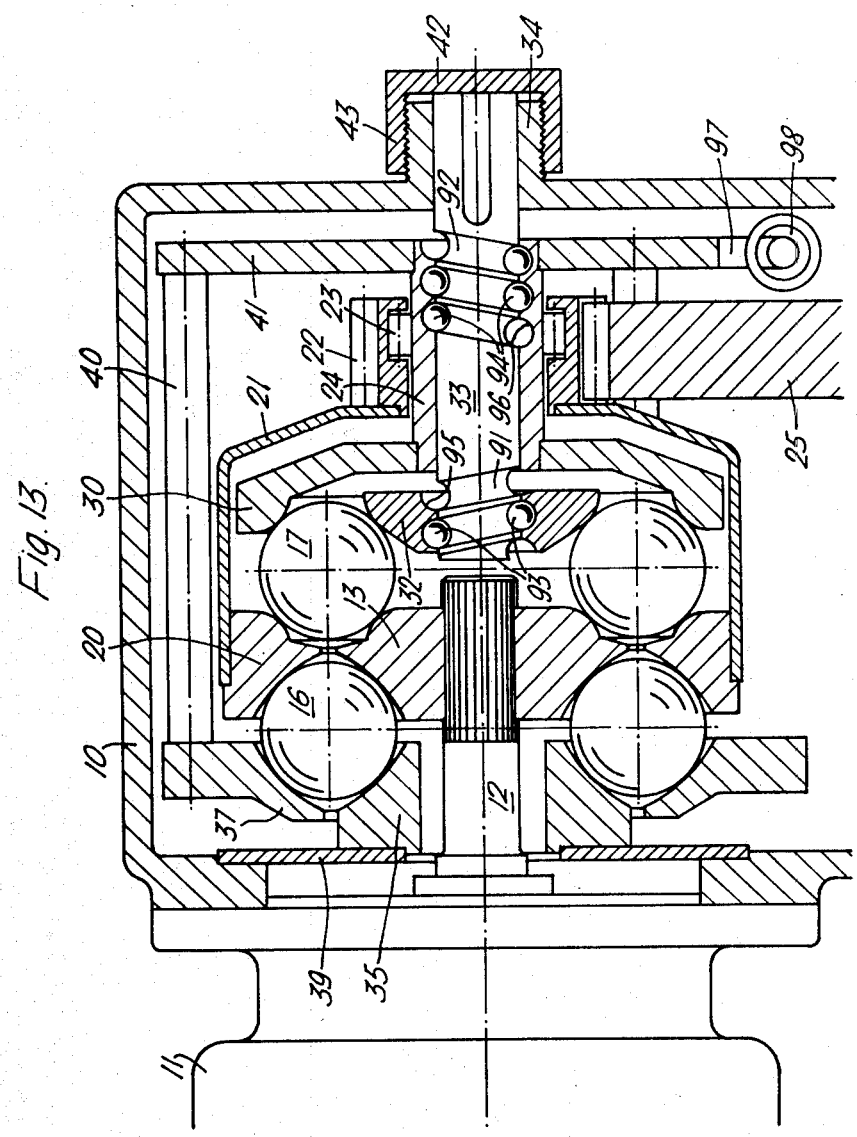

In FIG. 13 a modification of the power transmission described in connection with FIGS. 1 and 2 is shown. Parts corresponding to those of the latter structure have been designated with the same reference numerals as used in said figures. In the embodiment of FIG. 13 the non-rotatable shaft 33 is provided with oppositely directed helical grooves 91 and 92 in which balls 93 and 94 respectively are received which are also in engagement with corresponding helical grooves 95 and 96 formed in the bore of the runway ring 32 and the sleeve 24 respectively. A projection 97 on the plate 41 is connected to one end of a tension spring 98 the opposite end of which is connected to the housing 10, so that the spring counteracts the torque transmitted to the runway bodies 30 and 37. In this arrangement an increase of the torque affecting the ring 32 in one direction will cause an increased axial thrust on the ring whereby the pressure acting between the ball and the ring runway is also increased. In a similar way the ball-and-groove coupling between the shaft 33 and the sleeve 24 connected with the spring loaded runway bodies 30 and 37 will cause automatic adjustment of the gear ratio in dependence of the transmitted torque.

In another arrangement for automatic load controlled variation of the gear ratio the cylindrical sleeve 45, FIG. 2, is secured to the shaft 33 carrying the runway body 32, and said shaft 33 is made rotatable against the action of a spring. The torque transmitted to the runway body 32 being always half the torque of the input shaft 12, an automatic control of the gear ratio can be obtained by suitable choice of the spring torque.

Many modifications of the devices shown and described above can be made within the scope of the invention.

In the preceding calculations all equations have been derived from the assumption of equal size of the two sets of balls, using the radius as unit of length.

There is, however, nothing to prevent the employment of different diameters for the two sets of balls, if the formulas for computation of runway cross sections are amended correspondingly.

As an example it can be mentioned that in the embodiment of two runway pairs being spherical, having external radius r at one side and internal radius R at the other side, and ball diameters D and $D_1$ for the two sides respectively, the remaining pairs of runways are determined by the cross section shapes given by the parametric presentation:

$$X = \left(1 - \frac{1}{2A/D^2 - 1/t}\right) \cdot \sqrt{R(R - D_1) - AF}$$

$$Y = \frac{\sqrt{D^2/4 + At(tF - 1)}}{1 - D^2/2At}$$

$$Z = \left(1 + \frac{1}{2A/D_1^2 + t}\right) \cdot \sqrt{r(r + D) - At(tF - 1)}$$

$$Y_1 = \frac{\sqrt{D_1^2/4 + AF}}{1 + D_1^2 t/2A}$$

in which $A = D\sqrt{R(R - D_1)}$ and $F = F(t) = \frac{t + \ln t + C}{(t + 1)^2}$, while D, $D_1$, r and R may be chosen arbitrarily with the only limitation that $R/D_1 - r/D = 1$.

The gear ratio is for any choise of constants expressed by $$f = \sqrt{\frac{r(RrD_1 - ADF)}{R(RrD - AD_1 t(tF - 1))}}$$

I claim:

1. A power transmission for transmitting power from a driving shaft to a driven shaft along a main axis of the transmission and having a continuously variable gear ratio, in which torque is transmitted by friction forces at points of tangency between balls and runways and wherein the balls and runways are divided into two axially spaced groups, the balls in each group rolling on four runways, two of which runways are rotationally immovable with respect to each other and two of which runways are coupled to the driving and the driven shaft, respectively, each group of runways including at least one radially inner runway and at least one radially outer runway, at least two of the runways in each group being axially displaceable, the two groups of balls being coupled in parallel, a respective radially inner runway of each group being connected to a respective radially inner runway of the other group to resist relative axial movement of said radially inner runways, and a respective radially outer runway of each group being connected to a respective, radially outer runway of the other group to resist relative axial movement of said radially outer runways, the cross-sectional shapes of the runways being determined by the equations $$\frac{dy}{dx} = tg\,u;\ \frac{dy}{dz} = -tg\,v;\ \frac{dy_1}{dx} = tg\,u_1;\ \frac{dy_1}{dz} = tg\,v_1 \text{ and}$$

$$f = \frac{\sin u \cdot (y - \cos v)}{\sin v \cdot (y + \cos u)} = \frac{\sin u_1 \cdot (y_1 - \cos v_1)}{\sin v_1 \cdot (y_1 + \cos u_1)}$$

where x and z are the relative axial displacements of the balls and the radially outer and inner runways, respectively, f is the gear ratio of the transmission, y and $y_1$ are the corresponding variable radial distances of the ball centers from the main axis of the transmission, and u, $u_1$, v and $v_1$ are the angles between the ball radii to the points of tangency of the balls and runways.

2. A power transmission according to claim 1, wherein the runways in one group are concave, whereas the runways of the other group are convex.

3. A power transmission according to claim 1 or 2, wherein the runways are formed on three axially spaced pairs of annular bodies, a middle pair of said pairs of annular bodies being situated between the other two outer of said pairs, the bodies of each pair being spaced radially with respect to each other, and each of the bodies of said middle pair being provided with two opposite runways.

4. A power transmission according to claim 3, further comprising a stationary housing, in which the balls and runway bodies are mounted, wherein the radially inner, axially outer bodies are firmly connected to said housing, the radially inner middle body is slidingly, but non-rotatably mounted on the driving shaft of the transmission, the radially and axially outer bodies are connected together and jointly displaceable, but non-rotatable, and the radially outer middle body is geared to the driven shaft.

5. A power transmission according to claim 3 and comprising a housing, in which the balls and runway bodies are mounted, characterized in that axially outer bodies are firmly interconnected and carry two sets of planet gears, one of which is in engagement with a sun gear firmly connected to a radially inner middle body and slidingly, but non-rotatably mounted on the driving shaft, as well as with a ring gear provided on a inner wall of said housing, the second set of planet gears engaging with external teeth on a radially outer middle body, which is freely displaceable, and with a ring gear which is firmly mounted on the driven shaft (FIG. 7).

6. A power transmission according to claim 3, characterized in that radially inner, axially outer bodies are mounted on the driving shaft, and that middle bodies are freely displaceable and coupled for joint rotation, a radially outer middle body being provided with teeth in engagement with planet gears carried by radially and axially outer bodies, which are displaceable and jointly rotatable in the same direction as the driving shaft, but prevented from rotating in the opposite direction, said planet gears further engaging with a ring gear on the driven shaft (FIG. 9).

7. A power transmission according to claim 6, characterized in that a friction coupling is provided between one of the radially inner, axially outer bodies and corresponding radially and axially outer body, which friction coupling is adapted to engage when the transmission is adjusted to maximum gear ratio (FIG. 9).

8. A power transmission according to claim 1, characterized in that spring means are provided to urge at least one axially outer runway towards the balls.

9. A power transmission having a continuously variable gear ratio, the transmission comprising two groups of balls and runways, each group comprising four runways, including a first runway coupled to a driving shaft, a second runway coupled to a driven shaft, and two of the runways of each group being rotationally immovable with respect to each other, and the balls being arranged to roll on respective ones of the runways, wherein the two groups are coupled in parallel so that each group transmits torque from the driving shaft to the driven shaft, and means being provided to cause relative movement between the runways so as to vary the gear ratio, and the cross-sectional shapes of the runways being such that contact between the balls and the runways is maintained during said movement.

* * * * *